UNITED STATES PATENT OFFICE.

JOHN FIDLER, OF NEW ALBANY, INDIANA.

IMPROVEMENT IN JOURNAL-BOX ALLOYS.

Specification forming part of Letters Patent No. 15,804, dated September 30, 1856.

*To all whom it may concern:*

Be it known that I, JOHN FIDLER, of New Albany, in the county of Floyd and State of Indiana, have invented a new composition of metals to be used in machinery of all kinds to lessen the effect of friction; and I do hereby declare that the following is a full and exact description thereof, and of the ingredients composing the same and the mode of making it.

The nature of my invention consists in providing a new metal to be used as a substitute for brass and all other compositions heretofore used in machinery and carriages of all kinds to lessen the effect of friction.

To enable others skilled in machinery and the composition of metals to make and use my invention, I will proceed to describe the composition of what I call "Fidler's metal." It is made as follows, to wit: Melt six pounds of copper, then add four pounds of block-tin, mix and pour out in ingots. To each pound of the product add nine pounds of zinc, melt and mix, and the product will be the composition above named.

The composition I claim I believe never was used by any other person but myself. I believe it to be the only composition that can be used for all purposes in locomotives and other steam-engines for ornaments as well as friction. I believe it to be the only composition that can be placed upon an axle unsupported on the sides that will turn and can be planed and finished to any shape or finish. I believe there is no alloy of any kind that can be used for all locomotive purposes that will not cost less than three times the price of this, (three times as much as this.) There are many thousands of pounds of this metal made by me and used for all purposes of locomotion on the New Albany and Michigan railroad. The small quantity of tin used lowers the heat of the copper to a temperature or degree of heat at which it will readily unite with the zinc. This metal is very firm and not easily marked with a hammer, and is susceptible of a high polish. Any additional quantity of block-tin would make it softer, so that it would not bear the heat caused by friction, and then if not supported on the side would soon crush. The metal I make needs no support on the side, and will answer in any form. I hereby disclaim all right to a patent for any alloy or composition other than the metal consisting of the ingredients and proportions herein specified.

What I claim as my invention is—

The composition of the ingredients above named in the above-specified mode and proportions.

JOHN FIDLER.

Witnesses:
JAMES C. MOODY,
JNO. W. CHILDS.